US009140385B2

(12) United States Patent
Meijer

(10) Patent No.: US 9,140,385 B2
(45) Date of Patent: Sep. 22, 2015

(54) ENVELOPE ELEMENT FOR A PIPELINE, MOLD FOR MANUFACTURE THEREOF, AND METHOD FOR COVERING A PIPELINE

(75) Inventor: Karst Meijer, Leeuwarden (NL)

(73) Assignee: LANKHORST ENGINEERED PRODUCTS B.V., Sneek (NL)

(*) Notice: Subject to any disclaimer, the term of this patent is extended or adjusted under 35 U.S.C. 154(b) by 93 days.

(21) Appl. No.: 13/993,356

(22) PCT Filed: Dec. 12, 2011

(86) PCT No.: PCT/NL2011/050844
§ 371 (c)(1),
(2), (4) Date: Aug. 20, 2013

(87) PCT Pub. No.: WO2012/081976
PCT Pub. Date: Jun. 21, 2012

(65) Prior Publication Data
US 2013/0330131 A1    Dec. 12, 2013

(30) Foreign Application Priority Data
Dec. 16, 2010   (NL) ..................................... 2005866

(51) Int. Cl.
| E21B 17/10 | (2006.01) |
| F16L 1/26 | (2006.01) |
| B63B 21/66 | (2006.01) |
| F16L 1/12 | (2006.01) |

(52) U.S. Cl.
CPC ................ F16L 1/26 (2013.01); B63B 21/663 (2013.01); F16L 1/123 (2013.01)

(58) Field of Classification Search
USPC ........... 405/195.1, 211, 212, 216; 441/1, 133; 166/241.6, 241.7; 114/243
See application file for complete search history.

(56) References Cited

U.S. PATENT DOCUMENTS

| 2,605,844 | A | * | 8/1952 | Clark, Jr. .................... 166/241.7 |
| 3,785,407 | A | | 1/1974 | Waite et al. |
| 4,398,487 | A | | 8/1983 | Ortloff et al. |
| 4,694,865 | A | | 9/1987 | Tauschmann |
| 5,575,333 | A | * | 11/1996 | Lirette et al. ............... 166/241.1 |
| 7,458,752 | B2 | | 12/2008 | Esselbrugge et al. |
| 8,555,964 | B2 | * | 10/2013 | MacLeod .................... 166/241.6 |
| 2006/0153642 | A1 | | 7/2006 | Esselbrugge et al. |
| 2007/0231077 | A1 | * | 10/2007 | Burgess ........................ 405/216 |

FOREIGN PATENT DOCUMENTS

| FR | 2508569 A1 | 12/1982 |
| WO | 8502003 A1 | 5/1985 |
| WO | 2004020777 A1 | 3/2004 |

* cited by examiner

Primary Examiner — Sean Andrish
(74) Attorney, Agent, or Firm — Pearne & Gordon LLP

(57) ABSTRACT

A plastic envelope element for an underwater pipeline comprises at least one local spring portion manufactured integrally with the envelope element. The envelope element is modular in circumferential direction of the pipeline. The local spring portion is at least formed by a wall portion of the envelope element in the relaxed condition projecting on the inner side of the envelope element. In its tensioned condition, the local spring portion does not project, or projects to a lesser extent than in the relaxed condition, on the inner side of the envelope element, such that in its fitted condition the local spring portion presses under its spring force against the pipeline. The projecting wall portion extends bridgingly between two mutually parallel and mutually spaced hinge edges of the projecting wall portion. Between the non-adjoining portion of other edges, on the one hand, and remaining portions of the envelope element located next to the spring portion, on the other hand, in the relaxed condition at least one passage is formed in the envelope element.

16 Claims, 5 Drawing Sheets

ENVELOPE ELEMENT FOR A PIPELINE, MOLD FOR MANUFACTURE THEREOF, AND METHOD FOR COVERING A PIPELINE

CROSS-REFERENCE TO RELATED APPLICATIONS

This application is the National Stage of International Application No. PCT/NL2011/050844, filed Dec. 12, 2011, which claims priority to Netherlands Application No. 2005866, filed Dec. 16, 2010. The contents of these applications are hereby incorporated by reference in their entireties.

TECHNICAL FIELD OF THE INVENTION

The invention relates to a plastic envelope element for an underwater pipeline, configured for, in fitted condition, at least partly enveloping the pipeline, wherein the envelope element is modular for forming a tube around the pipeline with similar such envelope elements linked up in circumferential direction of the pipeline in their fitted conditions. The invention also relates to a mold especially designed for manufacturing such an envelope element. The invention further relates to a method for covering a pipeline with such envelope elements.

DESCRIPTION OF RELATED ART

Such plastic envelope elements for underwater pipelines are known. For instance, from WO2004/020777A1 such an envelope element is known which is also called "Vortex Induced Vibration strake", or "VIV-strake". Such a VIV-strake is provided on its outer side with (fin-shaped) projections. Owing to these projections, vibrations of the pipeline induced by vortices occurring on the downstream side of the pipeline of the water flowing along the pipeline, are suppressed.

It is noted that the invention relates not only to envelope elements in the form of VIV-strakes, but also to envelope elements without such projections designed for suppressing vortex induced vibrations. Thus, the invention can also relate to an envelope element that is for instance especially intended for protecting an underwater pipeline from impacts, without such projections being used with the envelope element.

Such envelope elements are usually fitted to the pipeline above water and then lowered under water. Especially when sinking the pipeline to (very) great depth, a (very) high hydrostatic pressure prevailing there is exerted on the sunk pipeline. As a result, in certain cases, the pipeline is noticeably compressed, i.e., the outside diameter of the pipeline is reduced. This occurs for instance to a relatively great extent with a pipeline that is provided on its outer side with a relatively thick coating. Such a coating is usually of foam-like material and is usually relatively easy to compact under the influence of a great hydrostatic pressure. The coating mostly serves for thermal insulation of the material transported in the interior of the pipeline. This thermal insulation is important, for instance, to ensure that material that comes out of the bottom with a high temperature, such as for instance crude oil having temperatures of 120 to 140 degrees Celsius, retains its temperature as much as possible during transport via the pipeline. What is thus achieved is that the viscosity of the material to be transported is held at a favorable level so that the material can be pumped efficiently.

A drawback of the fact that the outside diameter of a pipeline is reduced upon sinking the pipeline to great depths is that the envelope elements, which above water have been fitted tightly around the pipeline, can come loose at great depths. The envelope elements can then start to shift relative to each other or detach from the pipeline, so that their function is lost. This can also happen in the case where the envelope elements are held by means of straps extending in circumferential direction around the pipeline. The fact is that due to the reduced outside diameter of the pipeline, these straps also come loose, so that the envelope elements and the straps can shift relative to each other.

FR2508569A1 shows an envelope element for an underwater pipeline. That is, in the FIGS. 6, 7, 8 and 9 of FR2508569A1, a streamlined cover 220 for a pipeline is shown, which cover is formed of two shells which are joined through hinges 226 at one end and through detachable connections at the other end. The two shells are each provided with a spring element 230. The two spring elements 230 can resiliently clamp a pipeline. A drawback of this streamlined cover 220 is that there is a large slit-shaped interruption present in the cover between the two spring elements 230. In FR2508569A1, for that matter, this slit-shaped interruption is more or less covered by the large tail portions 222 of the streamlined cover 220. In many applications of envelope elements, such slit-shaped interruptions in the covering are undesired. Also, in many applications of envelope elements such tail portions are undesired. A drawback of the manner of resiliently clamping a pipeline as known from FR2508569A1 is therefore that this known manner is undesired for many applications of envelope elements.

Incidentally, it is noted that from WO85/02003A1, a tubular envelope 2 for a pipeline 1 is known, which envelope 2 consists of several tube segments which are placed in line against each other. Each tube segment consists of an inner tube 5, an outer tube 3 and a foam layer 4 between the inner tube 5 and the outer tube 3. The foam layer 4 serves as thermal insulation for the material transported through the pipeline 1. Placed between the envelope 2 and the pipeline 1 are separate, annular sliding elements which have some resilient action. Different designs of these annular sliding elements are indicated in WO85/02003A1 with the reference signs 9, 9', 9", 9''' and 9''''. It is noted that the sliding elements 9, 9', 9", 9''' and 9'''' are not manufactured integrally with the envelope 2. Furthermore, it is noted that the envelope 2 and the separate sliding elements 9, 9', 9", 9''' and 9'''' are all annular and are therefore not modular in circumferential direction of the pipeline. Both the envelope 2 and the separate sliding elements can be provided around a pipeline only by sliding them axially over an end of the pipeline. In various practical situations, such a method of fitting is undesired and/or impossible. With regard to WO85/02003A1 it is further noted that, in principle, reduction of the outside diameter of the pipeline 1 or of the envelope 2 under the influence of hydrostatic pressure does not play a role in WO85/02003A1. This is because the foam layer 4, although it is in principle easy to compress, is firmly confined between the inner tube 5 and the outer tube 3. In fact, therefore, WO85/02003A1 shows the confinement of the foam layer 4 between the inner tube 5 and the outer tube 3 as a solution for realizing a hydrostatic pressure-resistant covering for a pipeline provided with thermal insulation. This solution is very laborious and in various practical situations undesired and/or impossible.

SUMMARY OF THE INVENTION

It is an object of the invention to provide at least an alternative solution according to which the envelope elements are prevented from coming loose with respect to the pipeline, which alternative solution is at least efficient and reliable.

To this end, the invention provides a plastic envelope element for an underwater pipeline, configured for, in fitted condition, at least partly enveloping the pipeline, wherein the envelope element is modular for forming a tube around the pipeline with similar such envelope elements linked up in the circumferential direction of the pipeline in the fitted conditions of said envelope elements, the envelope element comprising an inner side which in the fitted condition faces the pipeline and an outer side which in the fitted condition faces away from the pipeline, and further comprising at least one local spring portion manufactured integrally with the envelope element, which local spring portion with respect to remaining portions of the envelope element located next to the local spring portion functions as a local spring and is deformable under spring force of the local spring portion from a relaxed condition of the local spring portion to a tensioned condition of the local spring portion, and vice versa, wherein:

the relaxed condition occurs at least in a not yet fitted condition of the envelope element, and in the relaxed condition the local spring portion projects at least partly on the inner side of the envelope element; and the tensioned condition occurs at least in the fitted condition of the envelope element, and in the tensioned condition the local spring portion does not project or projects to a lesser extent than in the relaxed condition on the inner side of the envelope element such that the local spring portion in the fitted condition presses under said spring force of the local spring portion against the pipeline;

characterized in that the local spring portion is at least formed by a wall portion of the envelope element projecting in the relaxed condition on the inner side of the envelope element, which projecting wall portion is resiliently hingeable with respect to said remaining portions of the envelope element located next to the local spring portion, while said projecting wall portion extends bridgingly between two mutually parallel and mutually spaced hinge edges of said projecting wall portion, and wherein the projecting wall portion is resiliently hingeable about both said hinge edges simultaneously with respect to said remaining portions of the envelope element located next to the local spring portion, wherein at least a portion of other edges, not being the two said hinge edges, of the projecting wall portion does not adjoin said remaining portions of the envelope element located next to the local spring portion, in a manner such that between the non-adjoining portion of said other edges, on the one hand, and said remaining portions of the envelope element located next to the local spring portion, on the other hand, in the relaxed condition at least one passage is formed in the envelope element.

The invention furthermore provides a mold, especially designed for manufacturing said envelope element according to the invention, wherein the mold has internal walls that define a mold cavity of the mold, which mold cavity corresponds to the shape of said envelope element according to the invention.

The invention furthermore provides a method for covering a pipeline with said envelope elements according to the invention, comprising:

above water forming a cover tube around the pipeline by bringing several similar such envelope elements linked together in the circumferential direction of the pipeline in the fitted conditions of said envelope elements; and sinking under water the pipeline with the cover tube formed therearound.

The envelope element according to the invention is modular for forming a tube around the pipeline with similar such envelope elements linked up in circumferential direction of the pipeline in their fitted conditions. Through such a modularity, the envelope element, including the at least one spring portion manufactured integrally therewith, can have a withdrawable form, so that it can be manufactured in a simple and inexpensive manner, for instance with an appropriate mold in an injection molding process. Such a modularity further offers the advantage that in various practical situations the envelope elements can be fitted around the pipeline in a simple manner. This in contrast to an alternative envelope element which is already tubular in itself. Such an alternative envelope element can in fact be fitted around a pipeline only by sliding the alternative element axially over an end of the pipeline.

The envelope elements according to the invention can above water be arranged around the pipeline with a tight fit. The at least one local spring portion, manufactured integrally with the envelope element, of a thus fitted envelope element is then in tensioned condition. In this tensioned condition, the at least one spring portion does not project or projects only slightly on the inner side of the envelope element. The spring portion, under its spring force, then presses very strongly against the pipeline. When the pipeline with the envelope element fitted thereon is then lowered under water, the pipeline, as a result of the increasing hydrostatic pressure, is gradually compressed further and further, that is, the outside diameter of the pipeline is gradually reduced. The at least one spring portion then deforms gradually under its spring force to a gradually lesser tensioned condition, in which the at least one spring portion projects further and further on the inner side of the envelope element and keeps pressing against the pipeline. In this manner, therefore, the envelope elements are prevented from coming loose with respect to the pipeline.

In order to prevent the at least one spring portion reaching its relaxed condition at the intended depth below the water surface, it is possible when designing an envelope element according to the invention to tune the extent to which the at least one spring portion projects in its relaxed condition on the inner side of the envelope element to the expected diameter reduction for a specific pipeline at the intended maximum depth below the water surface. In practice, however, it appears that with most pipelines, the eventual diameter reduction is so limited that one single design of an envelope element can suffice for use with a great many types of pipelines and a great many different depths.

An additional advantage of an envelope element according to the invention is that one single design of an envelope element can be used for a wider range of pipelines with slightly different outside diameters, irrespective of whether or not these pipelines are brought to such a great depth under the water surface that diameter reduction resulting from hydrostatic tension would play a role. With conventional envelope elements, fairly soon a different design and hence also a different mold will be required for the envelope element if a pipeline of a different diameter is to be enveloped. Owing to the at least one spring portion, the invention thus offers the advantage that with one single design and therefore with one single mold, several uses are possible. This saves costs and time.

As the at least one local spring portion is manufactured integrally with the envelope element, fitting and removing the envelope element according to the invention does not require any additional operations compared to the fitting and removing of a conventional envelope element. The integral manufacture of the at least one local spring portion further prevents the possibility that prior to or during fitting of the envelope element any loose parts could get lost or come loose in underwater operating condition. The solution offered by the invention is therefore also efficient and reliable.

According to the invention, the spring portion is at least formed by a wall portion of the envelope element projecting in the relaxed condition on the inner side of the envelope element, which projecting wall portion is resiliently hingeable with respect to the remaining portions of the envelope element located next to the spring portion. Such a projecting portion of a wall of the envelope element promotes the simplicity and the reliability of the spring portion.

According to the invention, the projecting wall portion extends in a bridging manner between two mutually parallel and mutually spaced hinge edges of the projecting wall portion, and the projecting wall portion is resiliently hingeable about both hinge edges simultaneously with respect to the remaining portions of the envelope element located next to the spring portion. This is beneficial to the strength and durability of the spring portion. The fact is that the bridging wall portion and the two hinge edges provide for a well spread transmission of pressing forces from the spring portion to the remaining portions of the envelope element.

According to the invention, at least a portion of other edges, not being the two hinge edges mentioned, of the projecting wall portion does not adjoin the remaining portions of the envelope element located next to the spring portion, in a manner such that between the non-adjoining portion of those other edges, on one side, and the remaining portions of the envelope element located next to the spring portion, on the other, at least one passage is formed in the envelope element. Through these measures, passages in the envelope element are integrated with the at least one spring portion, which is efficient. Passages in the envelope element prevent the formation of a film of stagnant (sea) water between the envelope element and the pipeline, which stagnant film of water would accelerate caking and/or corrosion on the pipeline. This integration of passages with the at least one spring portion further offers the advantage that the size of the passage opening is automatically regulated depending on the state of tension of the at least one spring portion. If the at least one spring portion is relatively little tensioned, it projects relatively far on the inner side of the envelope element and the intermediate space between the envelope element and the pipeline is relatively large. In that case, also the passage opening is automatically relatively large, which is desired to create sufficient current in the relatively large intermediate space.

A suitable material for manufacturing an envelope element according to the invention is, for instance, a foamed plastic and more particularly a polyethylene (PE). As a result, the element is not only light, but can also be manufactured from recycled plastic, which is environmentally friendly. Another suitable material is polypropylene (PP). Such a material has a good dimensional stability also at higher temperatures and can be used, for instance, with pipelines through which a fluid under increased temperature is transported.

In a preferred embodiment, the at least one spring portion is manufactured integrally with the envelope element in an injection molding process, whereby the at least one passage is formed in this injection molding process. Thus integrally manufacturing the spring portion and the passage in an injection molding process provides a highly reliable and stable tendency of the spring portion towards its relaxed condition, so that a fitted envelope element reliably presses against a (sunk) pipeline. This in contrast to an (imaginary) alternative envelope element where a spring portion would be obtained by punching it out of the envelope element. In fact, in such an alternative envelope element, the spring portion can tend towards a different relaxed condition, that is, the relaxed condition corresponding to the condition prior to punching out of the spring portion. The spring portion is bistable then. With such an alternative envelope element with bistable spring portion, the pressing of the element against a sunk pipeline is therefore not reliable. Therefore, integral manufacture of the spring portion and the passage in an injection molding process prevents the formation of a bistable spring portion.

In a further preferred embodiment, the envelope element comprises a first plurality of such spring portions which, viewed in the fitted condition, are situated at a distance from each other at least in the longitudinal direction of the pipeline. Such placement of the spring portions at a distance from each other in longitudinal direction of the pipeline promotes a uniform placement in longitudinal direction of the envelope element as a whole with respect to the pipeline. Also, this promotes a balanced distribution of the press-on forces in longitudinal direction, which is beneficial to a stable placement of the envelope element.

In a further preferred embodiment, the envelope element comprises a second plurality of such spring portions which, viewed in the fitted condition, are situated at a distance from each other at least in circumferential direction of the pipeline. Such placement of the spring portions at a distance from each other in circumferential direction of the pipeline promotes a uniform placement in circumferential direction of the envelope element as a whole with respect to the pipeline. Also, this promotes a balanced distribution of the press-on forces in circumferential direction, which is beneficial to a stable placement of the envelope element.

Preferably, the spring portions of said second plurality, viewed in circumferential direction of the pipeline perpendicular to the longitudinal direction of the pipeline, are mutually in line. This is of further benefit to the uniform placement in circumferential direction of the envelope element as a whole and the balanced distribution of the press-on forces in circumferential direction.

It is further preferred that the envelope element comprises at least two such second pluralities, which second pluralities are mutually situated at a distance from each other in longitudinal direction of the pipeline. This is of further benefit to the uniform placement, both in longitudinal direction and in circumferential direction, of the envelope element as a whole and the balanced distribution of the press-on forces, both in longitudinal direction and in circumferential direction.

Preferably, the two mutually parallel and mutually spaced hinge edges of the projecting wall portion, viewed in fitted condition, are parallel to the longitudinal direction of the pipeline. This promotes easy fitting of the envelope element and results, in use, in a uniform loading of the spring portion, which is beneficial to the durability of the spring portion.

The invention can be embodied in an assembly of an underwater pipeline and several envelope elements according to the invention, which envelope elements in their fitted conditions form a cover tube around the pipeline in that they are linked together in the circumferential direction of the pipeline.

The invention comes out very well if in such an assembly the pipeline comprises an inner tube, as well as a coating provided on the outer side of the inner tube, wherein the pipeline, upon sinking under water, as a result of the hydrostatic pressure on the sunk pipeline, is compressed, i.e., the outside diameter of the pipeline is reduced, which reduction of the outside diameter is substantially the result of compaction of the coating as a result of the hydrostatic pressure mentioned. That this reduced outside diameter as a result of the hydrostatic pressure is substantially the result of compaction of the coating occurs, for instance, if the coating is of a foam-like material which is typically easy to press together under the influence of (great) hydrostatic pressure. More generally, this occurs in the use of various other sorts of material of the coating, which various other sorts of materials, at least, allow the coating to be further compressed under the influence of (great) hydrostatic pressure than the inner tube.

In a further preferred embodiment of such an assembly, at least one strap extends along the outer sides of the envelope elements in circumferential direction of the pipeline for obtaining or promoting the holding of the envelope elements with respect to the pipeline. Such a strap enhances the function of the at least one spring portion in that the strap offers a reinforcing holding force during tensioning of the at least one spring portion.

Preferably, the at least one strap extends, at least viewed in radial projection, at the location of at least one of the at least one spring portion. Thus, the strap protects the at least one spring portion, which is beneficial to the strength and durability of the spring portion.

As already stated, the invention is also embodied in a mold which is especially designed for manufacturing an envelope element according to the invention. Such a mold therefore has internal walls that define a mold cavity of the mold which mold cavity corresponds to the shape of the envelope element.

BRIEF DESCRIPTION OF THE DRAWINGS

In the following, the invention is elucidated in further detail with reference to the schematic figures in the accompanying drawing.

DETAILED DESCRIPTION

Figure 1:
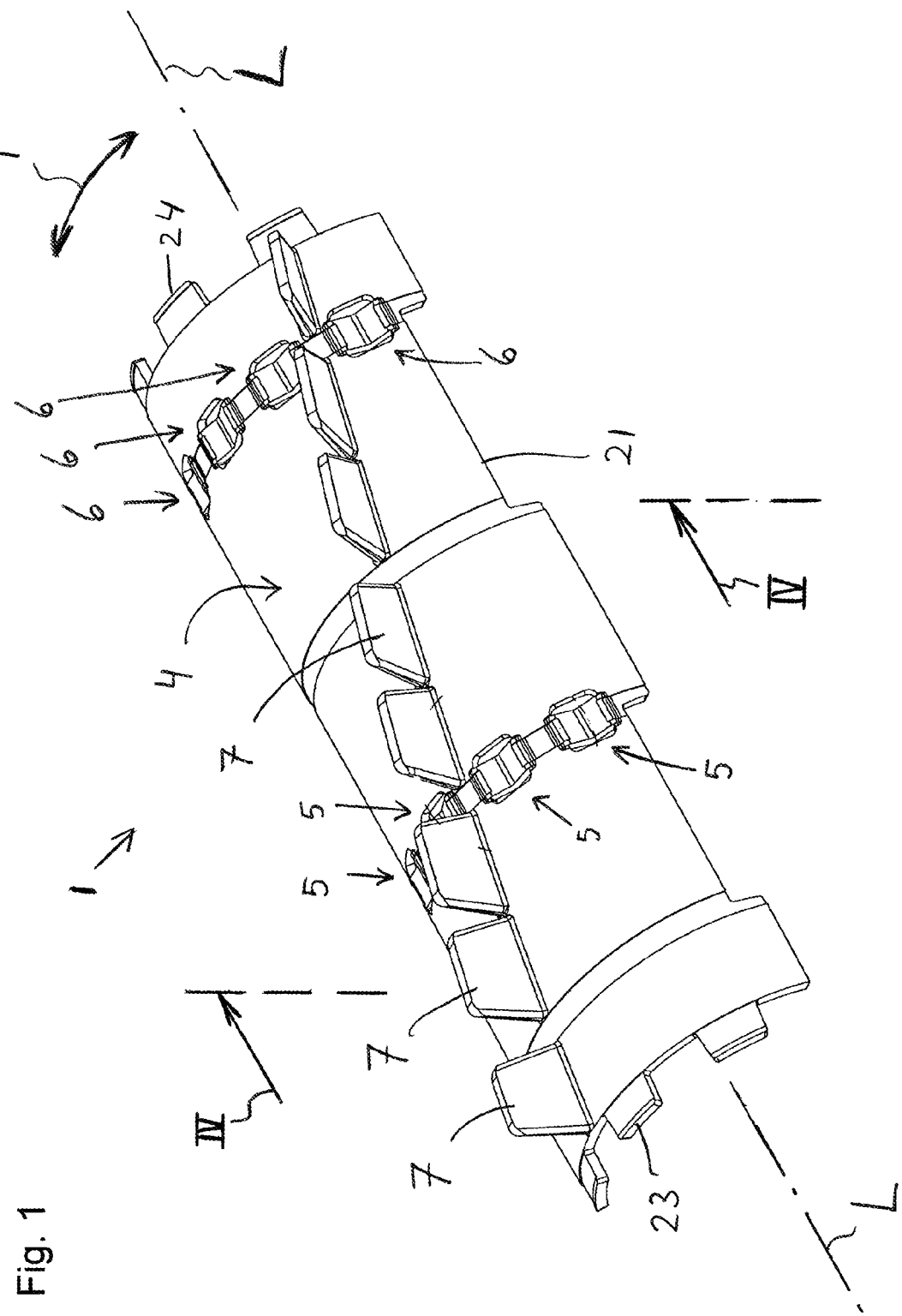
FIG. 1 shows an example of an embodiment of an envelope element according to the invention in a perspective view of the outer side of the envelope element.
Figure 2:
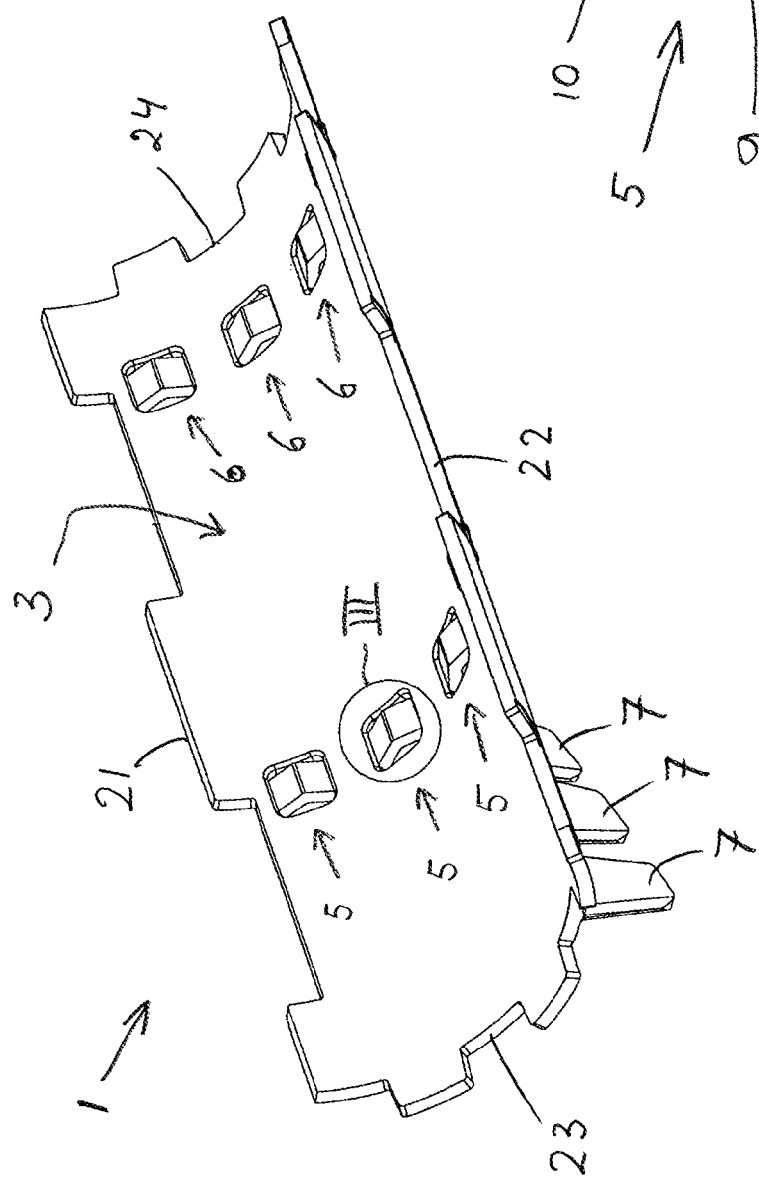
FIG. 2 shows the envelope element of FIG. 1 again, however, in a perspective view of the inner side of the envelope element.

In the figures, an envelope element 1 in the form of a "VIV-strake" is shown. FIG. 1 shows a view of the outer side 4 of the element 1, while FIG. 2 shows a view of the inner side 3 of the element 1. On the outer side 4, the VIV-strake 1 is provided with fin-shaped projections 7 which are directed to suppressing vortex induced vibrations. The element 1 is configured for, in fitted condition, at least partly enveloping a pipeline, such as the pipeline 2 shown in FIGS. 5 and 6. In FIG. 1, with reference letters "L" and "T", respectively, the longitudinal direction and the circumferential direction of the pipeline 2 are shown with respect to the element 1, if that element 1 were fitted to the pipeline 2.

The element 1 shown is modular for forming a tube around the pipeline 2 with similar such elements 1 linked up in the circumferential direction T of the pipeline 2 in their fitted conditions. The element 1 shown is furthermore modular for linking up in the longitudinal direction L of the pipeline 2 such similar elements 1 in their fitted conditions. For realizing these linked-up conditions, the element 1 comprises two opposite longitudinal edges 21 and 22 and two opposite circumferential edges 23 and 24, while each of theses edges is provided with a pattern of projections and recesses. In the example shown, three of the elements 1 can be linked together in the circumferential direction T for forming a first tube section extending over 360 degrees around the pipeline 2, with the respective projections and recesses of the longitudinal edges 21 fitting into the respective recesses and projections of the longitudinal edges 22. The projections and recesses of the longitudinal edges 21 and 22 form interlocking means of the elements 1 for blocking relative shifting in the longitudinal direction L of the elements linked up in circumferential direction T. A second such 360 degree tube section can be linked up in the longitudinal direction L with the first tube section, with the respective projections and recesses of the circumferential edges 23 of the first tube section fitting into the respective recesses and projections of the circumferential edges 24 of the second tube section. The projections and recesses of the longitudinal edges 23 and 24 form interlocking means of the elements 1 for blocking relative shifting in the circumferential direction T of the elements 1 linked in longitudinal direction L. In the linked-up arrangement of the two tube sections, one tube section is positioned in displaced relation with respect to the other tube section, in a manner such that the fins 7 of the first tube section extending along helicoidal shapes link up helicoidally with the fins 7 of the second tube section extending along helicoidal shapes.

The element 1 comprises a number of local spring portions 5, 6 manufactured integrally with the element 1. Each spring portion 5, 6 functions with respect to remaining portions 9 of the element 1 located next to the spring portion as a local spring and is deformable under its spring force from a relaxed condition to a tensioned condition, and vice versa.

In FIGS. 1 through 4, each of the spring portions 5 and 6 is shown in its relaxed condition which occurs in the condition shown there with the element 1 not yet fitted. In this relaxed condition, the spring portion projects at least partly on the inner side 3 of the element 1. In the FIGS. 5 and 6, each of the spring portions 5 is shown in its tensioned condition which occurs with the element 1 in the condition fitted to the pipeline 2. In the tensioned condition, the spring portions 5 shown there do not project or project to a lesser extent than in the relaxed condition on the inner side 3 of the element 1 such that the spring portions 5 press against the pipeline 2 under their spring force.

Now, reference is made especially to FIG. 1. The element 1 comprises a first set of four spring portions, namely, the four spring portions 5, which are situated at a distance from each other in the circumferential direction T. More particularly, the four spring portions 5 are mutually in line in the circumferential direction T. The element 1 furthermore comprises a second set of four spring portions, namely, the four spring portions 6, which are also situated at a distance from each other in the circumferential direction T. More particularly, the four spring portions 6 are also mutually in line in the circumferential direction T. The first set of four spring portions 5 is situated at a distance from the second set of four spring portions 6 in the longitudinal direction L.

Figure 3:
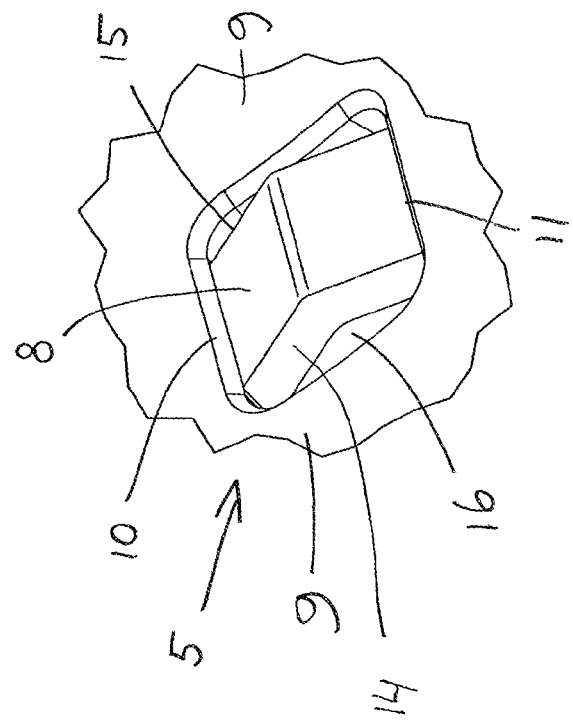
FIG. 3 shows an enlargement of the detail of the envelope element designated in FIG. 2 with the encircling III.

In the example shown, the spring portions 5 and 6 are mutually similar. Further details of these spring portions are described below on the basis of one of the spring portions 5. To that end, primarily reference is now made to FIG. 3. The spring portion 5 is at least formed by a wall portion 8 of the element 1 projecting on the inner side 3 of the envelope element in the relaxed condition, which projecting wall portion is resiliently hingeable with respect to the remaining portions 9 of the element 1 located next to the spring portion. The wall portion 8 extends in a bridging manner between two mutually parallel and mutually spaced hinge edges 10 and 11 of the wall portion 8. The wall portion 8 is resiliently hingeable about both hinge edges 10 and 11 simultaneously with respect to the portions 9 of the element 1. The two hinge edges 10 and 11 are parallel to the longitudinal direction L. In FIG. 3 it can be seen that two other edges 14 and 15 of the wall portion 8 do not adjoin the portions 9 of the element 1 and that between the edge 14 and the portions 9 a passage 16 is formed in the element 1. A similar passage (not visible in the perspective view of FIG. 3, however) is formed between the edge 15 and the portions 9.

Figure 4:
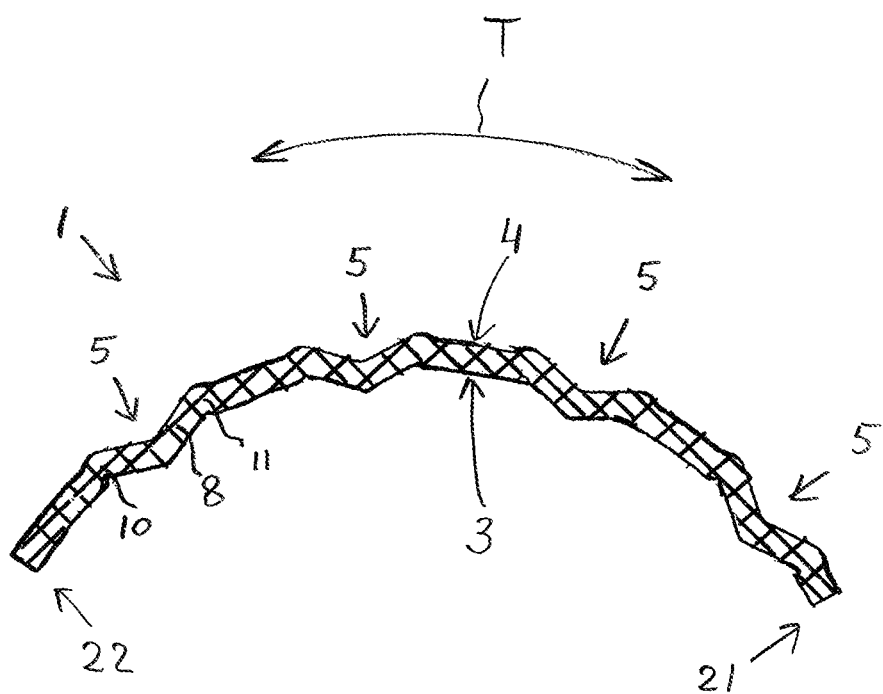
FIG. 4 shows the envelope element of FIG. 1 again, however, in cross section, with a number of the spring portions of the envelope cross-sectioned.
Figure 5:
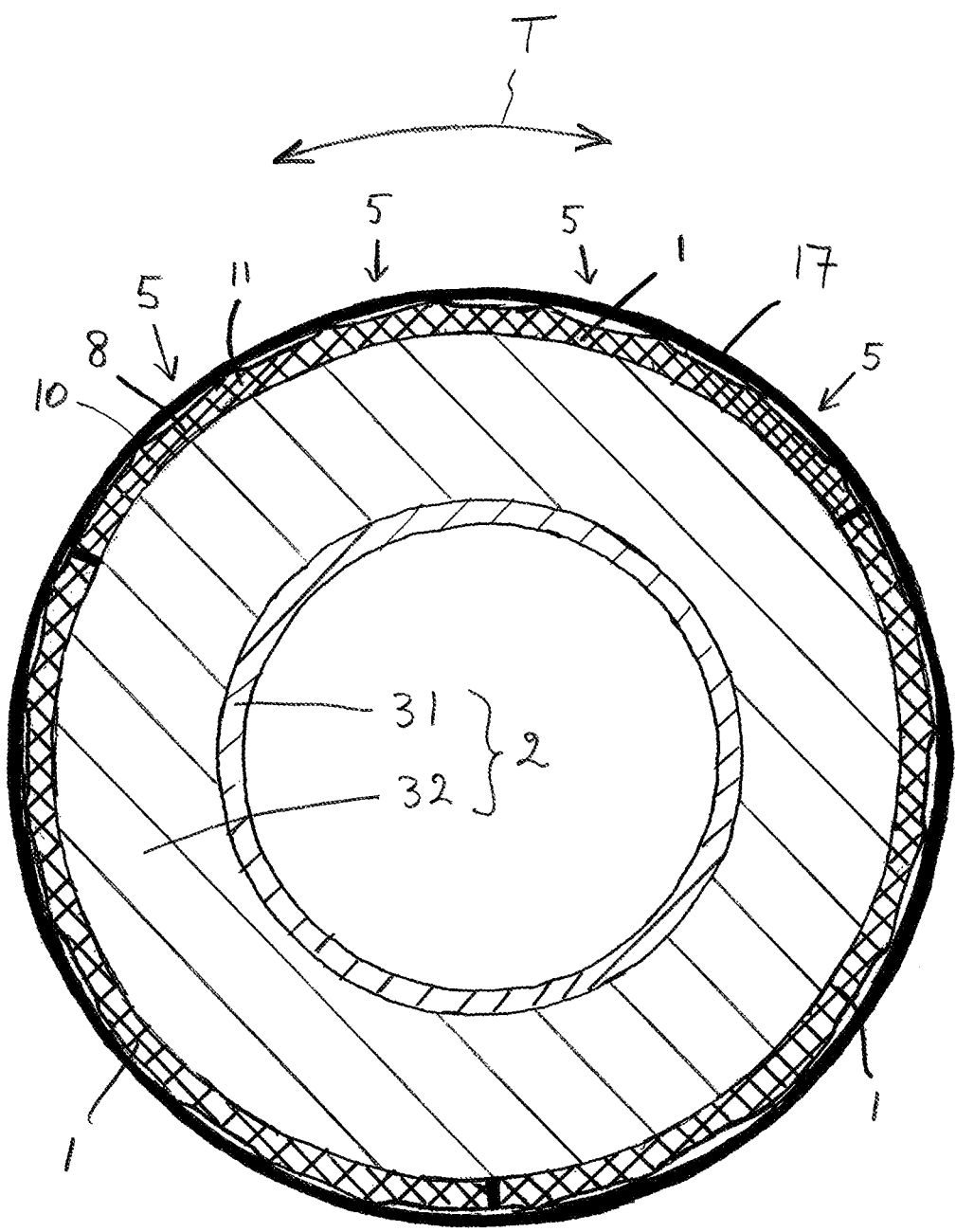
FIG. 5 shows the situation of FIG. 4 again, however, with the envelope element fitted above water to a pipeline not sunk yet, and the spring portions in tightly tensioned condition.
Figure 6:
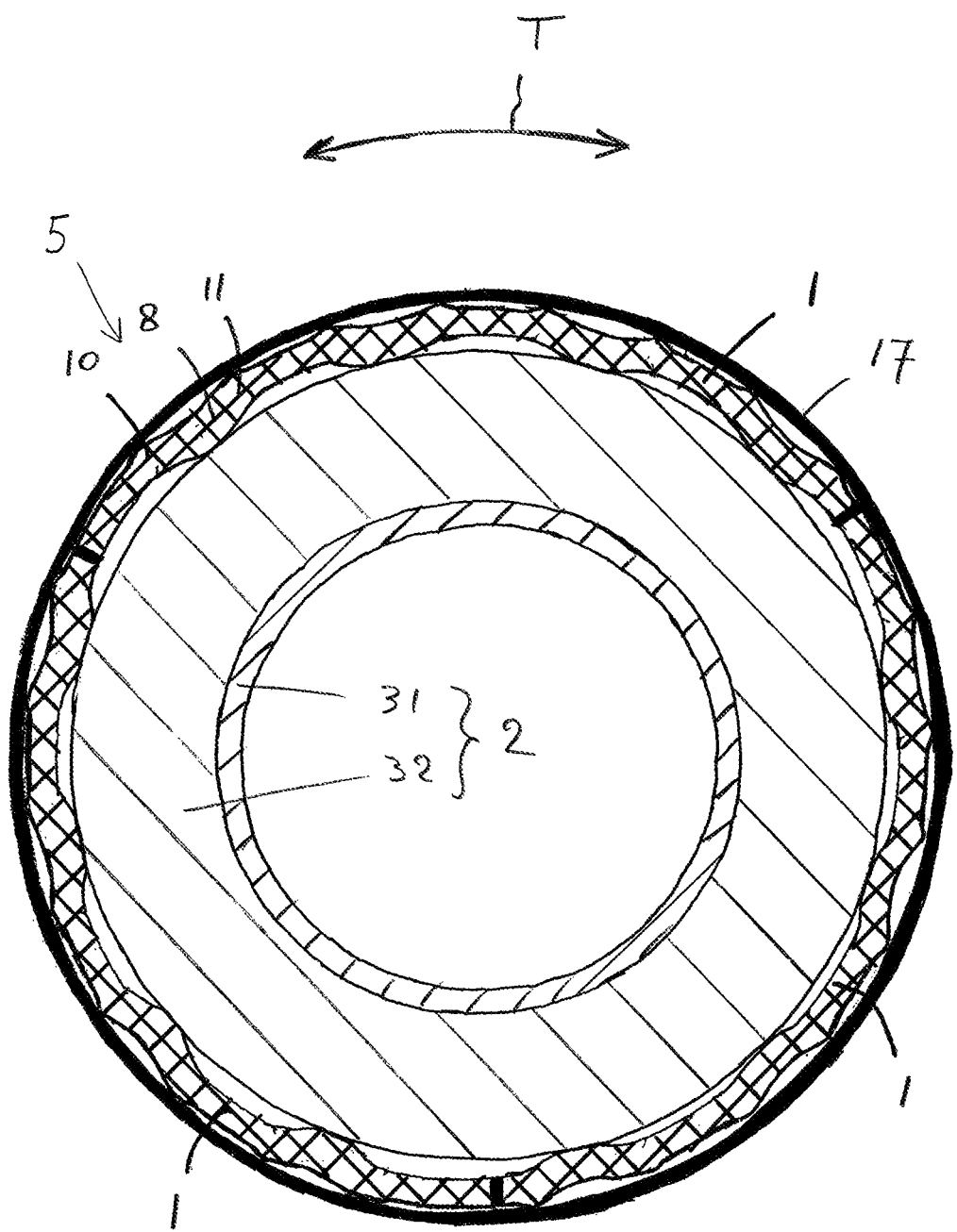
FIG. 6 shows the situation of FIG. 5 again, however, with the pipeline with the envelope element sunk deep under a water surface and the outside diameter of the pipeline reduced as a result of the hydrostatic pressure prevailing there.

Reference is made now to the FIGS. 4 through 6. FIG. 4 shows the element 1 in a cross section whereby the spring portions 5 are sectioned. In FIG. 4 the spring portions 5 are in their relaxed condition. FIGS. 5 and 6 show the situation of FIG. 4 once again, but with three elements 1 fitted to the pipeline 2 such that the three elements 1 form a tube section around the pipeline 2. The pipeline 2 consists of an inner tube 31 provided with a coating 32. In FIG. 5 the pipeline 2 is not yet sunk and the spring portions 5 of the elements 1 are in tightly tensioned condition. In this tightly tensioned condition, the spring portions 5 press against the pipeline 2. In FIG. 6 the pipeline 2 with the elements 1 has been sunk deep below a water surface and the outside diameter of the pipeline 2 is smaller than in FIG. 5 as a result of the prevailing hydrostatic pressure. The reduction of the outside diameter of the pipeline 2 is compensated in that the spring portions 5 in FIG. 6 are in a somewhat less tensioned condition than in FIG. 5, whereby the spring portions project further than in FIG. 5 on the inner sides 3 of the elements 1 and keep pressing against the pipeline 2.

Further, in FIGS. 5 and 6 it can be seen that a strap 17 extends along the outer sides 4 of the elements 1 in the circumferential direction T around the tube formed by the elements 1. More particularly, it can be seen that the strap 17, at least, viewed in radial projection, extends at the location of the spring portions 5. Also referring to FIG. 1, it is noted that the strap 17 extends between two adjacent fins 7 of each element 1. Instead of or in addition to the thus placed strap 17, if desired, an additional, similar strap can be used at the location of the other spring portions 6. Instead of or in addition to straps provided at the location of some of the spring portions, if desired, one or more of such straps may be provided not at the location of any of the spring portions at (mutually) different positions in longitudinal direction L of the tube.

It is noted that the above-mentioned examples of embodiments do not limit the invention and that within the scope of the accompanying claims, various alternatives are possible. For instance, diverse variations in the shapes, dimensions and plastic materials of the envelope element according to the invention are possible. Further, it is noted that an envelope element according to the invention can also be used with a pipeline that is not present under water but elsewhere above ground or underground. These and similar alternatives are understood to fall within the purview of the invention as defined in the appended claims.

The invention claimed is:

1. A plastic envelope element for an underwater pipeline, configured for, in fitted condition, at least partly enveloping the pipeline, wherein the envelope element is modular for forming a tube around the pipeline with similar such envelope elements linked up in the circumferential direction of the pipeline in similar fitted conditions of said envelope elements, the envelope element comprising an inner side which in the fitted condition faces the pipeline and an outer side which in the fitted condition faces away from the pipeline, and further comprising at least one local spring portion manufactured integrally with the envelope element, wherein the local spring portion with respect to remaining portions of the envelope element located next to the local spring portion functions as a local spring and is deformable under a spring force of the local spring portion from a relaxed condition of the local spring portion to a tensioned condition of the local spring portion, and vice versa, wherein:

the relaxed condition occurs at least in a not yet fitted condition of the envelope element, and in the relaxed condition the local spring portion projects at least partly on the inner side of the envelope element; and the tensioned condition occurs at least in the fitted condition of the envelope element, and in the tensioned condition the local spring portion does not project or projects to a lesser extent than in the relaxed condition on the inner side of the envelope element such that the local spring portion in the fitted condition presses under said spring force of the local spring portion against the pipeline;

characterized in that the local spring portion is at least formed by a wall portion of the envelope element projecting in the relaxed condition on the inner side of the envelope element, which projecting wall portion is resiliently hingeable with respect to said remaining portions of the envelope element located next to the local spring portion, while said projecting wall portion extends bridgingly between two mutually parallel and mutually spaced hinge edges of said projecting wall portion, and wherein the projecting wall portion is resiliently hingeable about both said hinge edges simultaneously with respect to said remaining portions of the envelope element located next to the local spring portion, wherein at least a portion of other edges, not being the two said hinge edges, of the projecting wall portion does not adjoin said remaining portions of the envelope element located next to the local spring portion, in a manner such that between the non-adjoining portion of said other edges, on the one hand, and said remaining portions of the envelope element located next to the local spring portion, on the other hand, in the relaxed condition at least one passage is formed in the envelope element.

2. The envelope element according to claim 1, wherein the at least one local spring portion is manufactured integrally with the envelope element in an injection molding process, wherein the at least one passage is formed in said injection molding process.

3. The envelope element according to claim 1, wherein the envelope element is modular for linking up in longitudinal direction of the pipeline similar further envelope elements in similar further fitted conditions of said similar further envelope elements.

4. The envelope element according to claim 1, further comprising at least one projection on the outer side of the envelope element for, in the fitted condition, in which the pipeline is in a flowing fluid, suppressing vibrations of the pipeline which are induced by vortices of the flowing fluid occurring on a downstream side of the pipeline.

5. The envelope element according to claim 1, wherein at least two local spring portions of said at least one local spring portion are longitudinally spaced local spring portions forming a first plurality of said longitudinally spaced local spring portions which, viewed in the fitted condition, are situated at a distance from each other at least in longitudinal direction of the pipeline.

6. The envelope element according to claim 1, wherein at least two local spring portions of said at least one local spring portion are circumferentially spaced local spring portions forming a second plurality of said circumferentially spaced local spring portions which, viewed in the fitted condition, are situated at a distance from each other at least in circumferential direction of the pipeline.

7. The envelope element according to claim 6, wherein the circumferentially spaced local spring portions of said second plurality, viewed in circumferential direction taken perpendicularly to the longitudinal direction of the pipeline, are mutually in line.

8. The envelope element according to claim 7, comprising at least two said second pluralities, wherein said second pluralities are situated at a distance from each other in longitudinal direction of the pipeline.

9. The envelope element according to claim 1, wherein the two mutually parallel and mutually spaced hinge edges of said projecting wall portion, viewed in the fitted condition, are parallel to the longitudinal direction of the pipeline.

10. An assembly of an underwater pipeline and several envelope elements according to claim 1, wherein said envelope elements in said fitted conditions of said envelope elements form a covering tube around the pipeline in that said envelope elements are linked up in the circumferential direction of the pipeline.

11. The assembly according to claim 10, wherein the pipeline comprises an inner tube, as well as a coating provided on an outer side of the inner tube, wherein the pipeline upon sinking under water is compressed as a result of the hydrostatic pressure on the sunk pipeline, that is, the outside diameter of the pipeline is reduced, which reduction of the outside diameter is substantially the result of compaction of the coating as a result of said hydrostatic pressure.

12. The assembly according to claim 10, wherein at least one strap extends along the outer sides of the envelope elements in circumferential direction of the pipeline for obtaining or promoting the holding of the envelope elements with respect to the pipeline.

13. The assembly according to claim 12, wherein the at least one strap, at least viewed in radial projection, extends at the location of at least one of the at least one local spring portion.

14. A mold, especially designed for manufacturing the envelope element according to claim 1, wherein the mold has internal walls that define a mold cavity of the mold, which mold cavity corresponds to the shape of said envelope element according to claim 1.

15. A method for covering a pipeline with envelope elements according to claim 1, comprising:
above water forming a cover tube around the pipeline by bringing said envelope elements linked together in the circumferential direction of the pipeline in the fitted conditions of said envelope elements; and
sinking under water the pipeline with the cover tube formed therearound.

16. The method according to claim 15, wherein the pipeline comprises an inner tube, as well as a coating provided on an outer side of the inner tube, wherein the pipeline, upon sinking under water, is compressed as a result of the hydrostatic pressure on the sunk pipeline, that is, the outside diameter of the pipeline is reduced, wherein said reduction of the outside diameter is substantially the result of compaction of the coating as a result of said hydrostatic pressure.

* * * * *

UNITED STATES PATENT AND TRADEMARK OFFICE
CERTIFICATE OF CORRECTION

| | | |
|---|---|---|
| PATENT NO. | : 9,140,385 B2 | Page 1 of 1 |
| APPLICATION NO. | : 13/993356 | |
| DATED | : September 22, 2015 | |
| INVENTOR(S) | : Karst Meijer | |

It is certified that error appears in the above-identified patent and that said Letters Patent is hereby corrected as shown below:

In the claims,

At Column 10 line 1, in Claim 1, please delete "such".

Signed and Sealed this
Seventeenth Day of May, 2016

Michelle K. Lee
*Director of the United States Patent and Trademark Office*